United States Patent [19]

Yoshida et al.

[11] Patent Number: 5,214,334

[45] Date of Patent: * May 25, 1993

[54] SLIP RING WITH BALANCED CENTER OF GRAVITY FOR USE IN DETECTING ROTATION OF MOTOR

[75] Inventors: Masao Yoshida, Gunma; Noboru Miyata, Kiryu; Masami Miyazaki, Maebashi, all of Japan

[73] Assignee: Mitsuba Electric Manufacturing Co., Ltd., Gunma, Japan

[*] Notice: The portion of the term of this patent subsequent to Jul. 21, 2009 has been disclaimed.

[21] Appl. No.: 757,174

[22] Filed: Sep. 10, 1991

Related U.S. Application Data

[62] Division of Ser. No. 625,101, Dec. 10, 1990, Pat. No. 5,132,579.

[30] Foreign Application Priority Data

Dec. 11, 1990 [JP] Japan .................................. 1-142943

[51] Int. Cl.$^5$ .............................................. H02K 13/02
[52] U.S. Cl. ..................................... 310/232; 310/43; 310/235
[58] Field of Search ............... 310/232, 219, 233, 231, 310/128, 235, 43, 237, 143, 147

[56] References Cited

U.S. PATENT DOCUMENTS

| | | | |
|---|---|---|---|
| 467,215 | 1/1892 | White | 310/233 |
| 511,328 | 12/1893 | Emery | 310/233 |
| 1,432,038 | 10/1922 | Russell | 310/237 |
| 3,514,654 | 5/1970 | Moresi | 310/237 |
| 3,959,705 | 5/1976 | Salihi | 310/219 |
| 4,484,389 | 11/1984 | Kogej et al. | 310/235 |
| 5,019,740 | 5/1991 | Altpeter | 310/233 |
| 5,132,579 | 7/1992 | Yoshida et al. | 310/232 |

FOREIGN PATENT DOCUMENTS

1385200  3/1988  U.S.S.R. .............................. 310/232

*Primary Examiner*—R. Skudy
*Attorney, Agent, or Firm*—Oliff & Berridge

[57] ABSTRACT

A slip ring with which a pair of brushes make contact includes a conducting portion which extends along an outer periphery of the slip ring over an angle of preferably about 210 degrees, and a non-conducting portion which extends over an angle of about preferably 150 degrees. A conductor which forms the conducting portion has a ring-like shape and also forms the non-conducting portion. The portion of the conductor which corresponds to the non-conducting portion has a small radius such that it is buried in an insulating resin material, a window through which an insulating resin material is exposed, or a recess through which an insulating resin material is exposed. The ring-like conductor provides a balanced center of gravity to the slip ring. The conductor may also include two or more conducting portions and two or more non-conducting portions.

22 Claims, 4 Drawing Sheets

2

SLIP RING WITH BALANCED CENTER OF GRAVITY FOR USE IN DETECTING ROTATION OF MOTOR

This is a division of U.S. patent application Ser. No. 07/625,101, filed Dec. 10, 1990, now U.S. Pat. No. 5,132,579.

BACKGROUND OF THE INVENTION

1. Field of the Invention

The present invention relates to a slip ring for use in detecting the rotation of an armature of a motor using a pulse signal, and more particularly to such a slip ring having a balanced center of gravity.

2. Description of the Related Art

Motors which require detection of the rotation of an armature are known. In such motors, an armature shaft has on it a rotation-detecting slip ring. The rotation-detecting slip ring usually consists of a conducting portion which extends along the outer periphery of the slip ring over an angle of about 210 degrees and a nonconducting portion which extends over the remaining angle of about 150 degrees. A pulse signal is generated and rotation is thereby detected by alternately providing a conducting state in which two brushes are in contact with the conducting portion and a non-conducting state in which either of the brushes is in contact with the non-conducting portion.

The slip ring is generally composed of a lightweight insulating resin material and a conductor which is made of a heavy-weight material, such as copper, and which covers a portion of the surface of the insulating resin material. In the conventional slip ring, the conductor exists only in the conducting portion of the slip ring, and the center of gravity of the slip ring is thus shifted from the axis of the armature shaft. This provides imbalanced rotation of the slip ring and thus prevents smooth rotation thereof. Hence, to provide balanced rotation, putty is conventionally attached to the rotor core as a balancer. However, balancing by use of putty requires skill and thus greatly complicates the manufacturing process. Moreover, any protrusion of the putty from the diameter of the armature makes the armature useless.

SUMMARY OF THE INVENTION

In view of the aforementioned problems of the conventional slip ring, an object of the present invention is to provide a slip ring which obviates the aforementioned problems.

In accordance with the present invention, the rotation detecting slip ring has an outer periphery which makes contact with a pair of brushes upon rotation of the slip ring about a rotational axis. The slip ring includes a conductor having a ring-like shape and defining: at least one conducting portion defining a first arc having a first radius from the rotational axis and extending along the outer periphery over a first angle; and at least one non-conducting portion defining a second arc extending over a second angle. An insulating material, preferably an insulating resin material, is associated with at least the non-conducting portion of the conductor. The insulating material extends along the outer periphery over the second angle and defines an insulating arc having the first radius.

According to a first aspect of the present invention, there is provided a slip ring with which a pair of brushes make contact upon rotation of the slip ring about a rotational axis. The slip ring comprises: a conductor having a ring-like shape and defining a conducting portion which extends along an outer periphery of the slip ring over an angle of about 210 degrees; and a non-conducting portion which extends over an angle of about 150 degrees. The portion of the conductor which corresponds to the nonconducting portion is associated with an insulating resin material and has a smaller radius relative to the rotational axis than the radius of the conducting portion such that it is buried in the insulating resin material.

According to a second aspect of the present invention, there is provided a rotation-detecting slip ring with which a pair of brushes make contact. The slip ring comprises: a conducting portion which extends along an outer periphery of the slip ring over an angle of about 210 degrees; and a non-conducting portion which extends over an angle of about 150 degrees. A conductor which forms the conducting portion has a ring-like shape and also forms the non-conducting portion. A portion of the conductor which corresponds to the non-conducting portion has a window through which an insulating resin material is exposed to the outer periphery of the slip ring.

According to a third aspect of the present invention, there is provided a rotation-detecting slip ring with which a pair of brushes make contact. The slip ring comprises: a conducting portion which extends along an outer periphery of the slip ring over an angle of about 210 degrees; and a non-conducting portion which extends over an angle of about 150 degrees. A conductor which forms the conducting portion has a ring-like shape and also forms the non-conducting portion. A portion of the conductor which corresponds to the non-conducting portion has a recess through which an insulating resin material is exposed to the outer periphery of the slip ring.

In any of the above-described rotation-detecting slip rings, the portion of the conductor which corresponds to the non-conducting portion may be made wider in an axial direction of the slip ring or thicker in a radial direction than a portion of the conductor corresponding to the conducting portion.

In addition, the conductor may have more than one conducting and non-conducting portions For example, for symmetry, the conductor may have two opposing conductor portions and two opposing non-conducting portions.

According to the present invention, it is possible to coincide the center of gravity of a slip ring with the axis of an armature shaft and thereby eliminate imbalanced rotation of the slip ring. The slip ring thus has a center of gravity "balanced" with the axis of the armature shaft.

BRIEF DESCRIPTION OF THE DRAWINGS

The invention will be described in detail with reference to the following drawings in which.

DETAILED DESCRIPTION OF THE PREFERRED EMBODIMENTS

Embodiments of the present invention will now be described with reference to the accompanying drawings.

Figure 1:
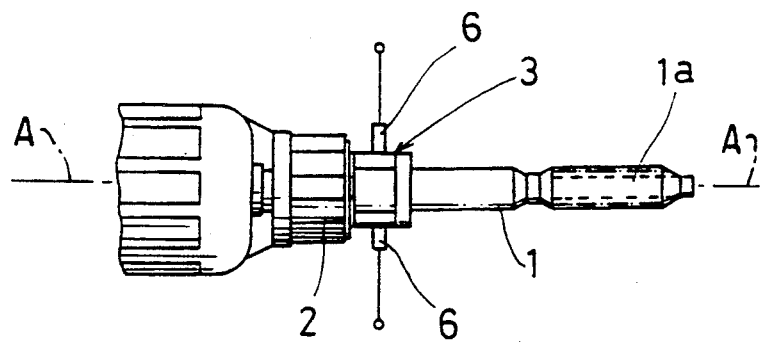
FIG. 1 is a perspective view of the essential parts of a rotor.

First, a first embodiment will be described below with reference to FIGS. 1 to 3. Referring first to FIG. 1, a commutator 2 and a rotation-detecting slip ring 3 are provided on an armature shaft 1 of a motor. The distal end of the armature shaft 1 forms an output gear 1a. The slip ring 3 rotates about a rotational axis A of the armature shaft 1. Brushes 6 ride on the outer periphery of the rotation-detecting slip ring 3.

The rotation-detecting slip ring 3 consists of a conducting portion 3a in which a conductor 5, which will be described in detail below, is exposed over a first angle of about 210 degrees of the outer periphery of the slip ring 3, and a non-conducting portion 3b in which a resin material 4 is exposed over the second remaining angle of about 150 degrees.

To achieve the above-described configuration, the conductor 5 has a ring-like form. A portion 5a of the conductor 5, corresponding to the conducting portion 3a, has an arc-like form with a radius $R_1$ from the axis A, and is disposed along the outer peripheral surface of the slip ring 3. A portion 5b corresponding to the non-conducting portion 3b defines an arc with a radius $R_2$ from the axis A, and is disposed inside of the outer peripheral surface of the slip ring 3 and buried in the insulating resin material 4. The radius $R_2$ is less than the radius $R_1$. The insulating resin material 4 of the non-conducting portion extends over the second angle to define an insulating arc having the radius $R_1$.

In consequence, the two brushes 6 are in a conducting state while they are in contact: with the conducting portion 3a during the rotation of the armature shaft 1, and are in a non-conducting state while either of the brushes is in contact with the non-contacting portion 3b, by which a pulse signal is generated to detect rotation. When necessary, the rotation speed can also be detected by counting the number of pulses.

As stated above, the slip ring 3 has the conducting portion 3a which extends over an angle of about 210 degrees and the non-conducting portion 3b extending over about 150 degrees. However, the center of gravity of the slip ring 3 does not shift greatly from the axis of the armature shaft 1 due to the presence of the portion 5b of the conductor buried in the resin material 4 in the non-conducting portion 3b, unlike the case of the conventional slip ring, and rotation of the armature shaft 1 is thus not imbalanced. As a result, the puttying process which would be required in the conventional slip ring to provide balance is eliminated, thus simplifying the manufacturing process and enhancing the reliability.

In addition to this, the conductor 5 is bent at an acute angle to define stepped portions at the boundaries of the portions 5a and 5b, thus increasing the weight of the stepped portions. This in turn increases the weight of the portion 5b and further balances the slip ring.

In the first embodiment, since the portion 5b of the conductor 5 corresponding to the non-conducting portion 3b has a smaller radius than the portion 5a corresponding to the conducting portion 3a, rotation of the armature shaft 1 may still be slightly imbalanced. To avoid this, the wall thickness of the portion 5b may be increased or the height of the portion 5b may be increased. In the case of increasing the wall thickness, the conductor 5 may be manufactured to a uniform thickness utilizing outer diameter cutting which is the finish process. The manufactured conductor 5 is assembled for the slip ring 3 and then cutting is conducted on the portions 5a and 5b at the stage of finishing to reduce the wall thickness of the portion 5a and thereby make it different relative to the wall thickness of the portion 5b. In that case, it is not necessary to increase the number of manufacturing processes.

Figure 4A:
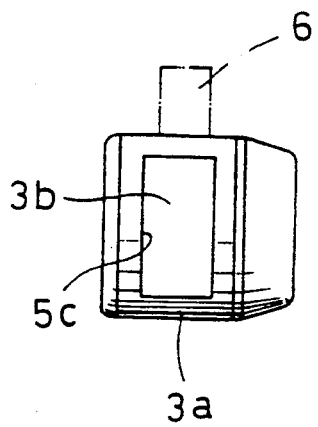
FIGS. 4A and 4B are respectively front and cross-sectional views of a second embodiment of the slip ring according to the present invention.
Figure 4B:
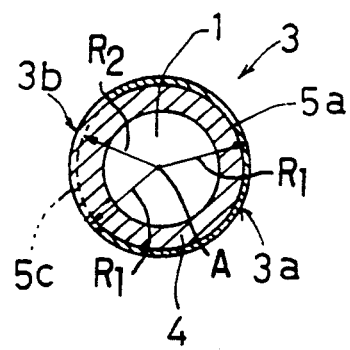
Figure 5:
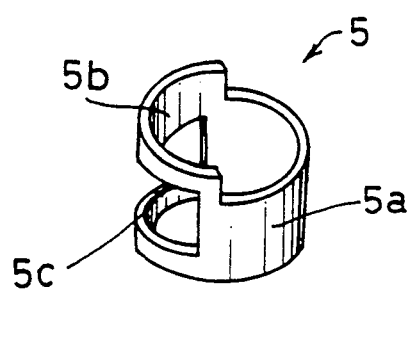
FIG. 5 is a perspective view of the conductor in FIGS. 4A and 4B.

A second embodiment of the present invention will be described below with reference to FIGS. 4A, 4B and 5.

In this embodiment, the portion 5b corresponding to the non-conducting portion 3b is wider in the axial direction of the armature shaft 1 than the portion 5a corresponding to the conducting portion 3a and the wider portion 5b has a window 5c at the central portion thereof with which the brushes are brought into contact to expose the resin material 4 on the outer periphery, of the slip ring. The outer periphery of the exposed resin material 4 defines the same radius $R_1$ as the conducting portion.

In this embodiment, rotation of the slip ring 3 is not imbalanced due to the presence of the conductor 5 in the non-conducting portion 3b, as in the case of the aforementioned first embodiment.

In this embodiment, although imbalance of the rotation is completely eliminated due to the presence of the wider portion 5b, it is not always necessary to make the portion 5b wider than the portion 5a. However, this configuration is very effective to provide balance. The same effect may be ensured by making the portion 5b corresponding to the non-conducting portion 3b thicker (by correcting the portion 5b in the radial direction of the slip ring) instead of making it wider (correcting it in the axial direction).

Figure 7:
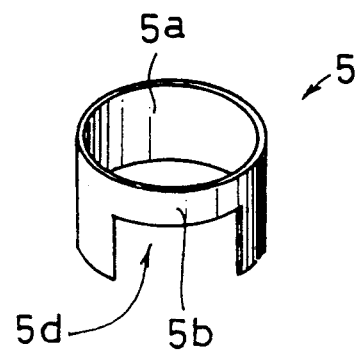
FIG. 7 is a perspective view of the conductor of FIGS. 6A and 6B.
Figure 6A:
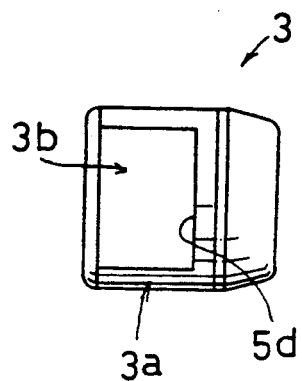
FIGS. 6A and 6B are respectively front and cross-sectional views of a second embodiment of the slip ring according to the present invention.
Figure 6B:
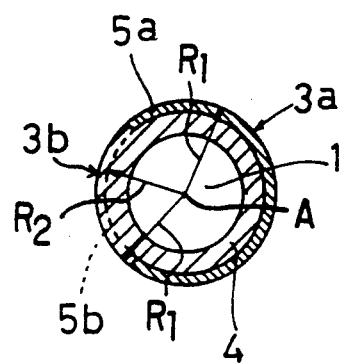

A third embodiment of the present invention will be described below with reference to FIGS. 6A, 6B and 7.

Figure 8:
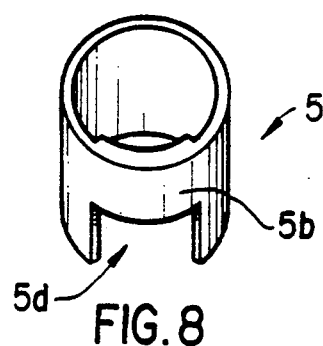
FIG. 8 is a perspective view of another embodiment of the conductor of FIGS. 6A and 6B.
Figure 9A:
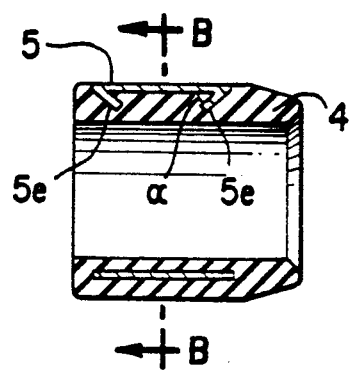
FIGS. 9A and 9B are cross-sectional front and side views, respectively, of a conductor similar in construction to the conductor of FIGS. 2A and 2B, the FIG. 9B view being taken along line A in FIG. 9A.
Figure 9B:
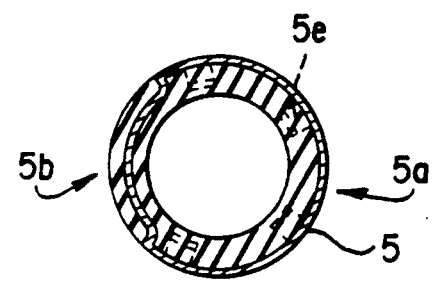

In this embodiment, the portion 5b corresponding to the non-conducting portion 3b has a recess 5d in place of the window. To provide a higher degree of balance, the portion 5b may be made wider in the axial direction or made thicker in the radial direction in this embodiment, as in the case of the above-described embodiments. FIG. 8 illustrates the conductor in which the portion 5b is made thicker in the radial direction.

As will be understood from the foregoing description, in the rotation-detecting slip ring according to the present invention, the outer peripheral portion thereof with which the brushes make contact has the non-conducting portion in which no conductor is exposed over an angle of about 150 degrees. However, in the non-conducting portion, the portion of the conductor corresponding to the non-conducting portion may be buried or have a window or a recess to expose the insulating material, and the conductor therefore exists over the entire periphery of the slip ring including the non-conducting portion thereof, unlike the conventional slip ring in which the conductor does not exist at all in the non-conducting portion.

In consequence, shift of the center of gravity of the rotation-detecting slip ring from the axis of the armature shaft can be eliminated reliably, and imbalance of the rotation of the rotor can thus the prevented. As a result, troublesome and complicated puttying work is eliminated. This greatly simplifies the manufacturing process of the slip ring and makes mass production of a reliable rotor at a low cost possible.

In the present invention, the portion of the conductor corresponding to the non-conducting portion can be made wide in the axial direction or thick in the radial direction to provide a higher degree of balance. In that case, the conductor exists uniformly over the entire periphery of the slip ring, and this provides a well balanced rotor.

Figure 10A:
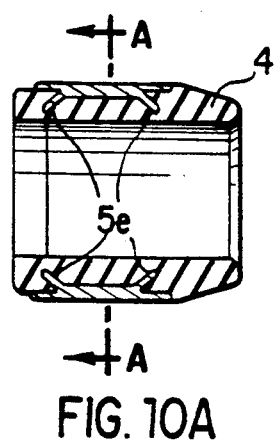
FIGS. 10A and 10B are cross-sectional front and side views, respectively, of a conductor similar in construction to the conductor of FIGS. 4 and 4B, the FIG. 10B view being taken along line B in FIG. 10A.
Figure 10B:
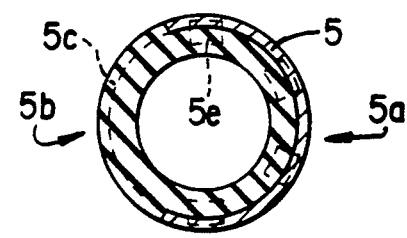

To form the slip ring 3, the conductor 5 is set in a mold and the resin material 4 in a fluid state is filled into the mold and solidified. The slip ring can then be removed from the mold. To enhance the securement of the conductor 5 to the resin material 4, the conductor 5 may be provided with radially inwardly projecting studs or claws for anchoring the conductor to the resin material 4 once the resin solidifies. For example, in the conductor 5 of the first embodiment illustrated in FIGS. 2A and 2B, studs or claws 5e (see FIGS. 9A and 9B) project radially inwardly (preferably at an angle α which is less than 90°) from the inner peripheral surface of the conductor 5, and are embedded within the insulating resin material to anchor the conductor in the resin material. The claws are preferably located in the conducting portion 5a of the conductor 5. The claws 5e in FIGS. 9A and 9B preferably extend generally toward each other to resist relative axial movement between the conductor 5 and resin material 4. FIGS. 10A and 10B illustrate the conductor of FIGS. 4A and 4B with claws 5e anchoring the conductor in the resin material Preferably, the claws 5e in FIGS. 10A and 10B extend in generally opposite directions to resist relative axial movement between the conductor 5 and resin material 4. While only one claw 5e may suffice for securement, it is preferable that a plurality of claws 5e be provided (as illustrated in FIGS. 9A, 9B, 10A, and 10B) and that the plurality of claws 5e are spaced around the conducting portion so as to maintain the balanced center of gravity of the slip ring.

Figure 11:
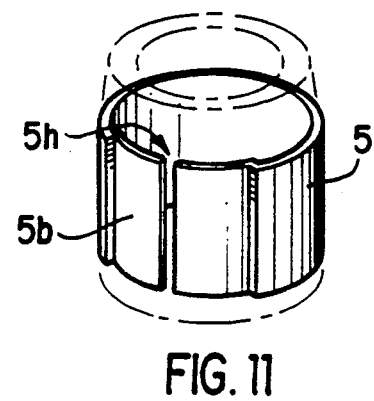
FIG. 11 is a perspective view of a conductor similar in construction to the conductor of FIG. 3 when formed from a flat strip.

It is possible to secure or anchor the conductor 5 in the resin material without claws. For example, the conductor of FIGS. 2A and 2B may be formed into a ring-like shape with conducting 5a and non-conducting 5b portions formed from a flat strip by punching and bending operations. As illustrated in FIG. 11, a narrow opening or gap 5h can be left in the non-conducting portion 5b between the ends of the flat strip after formation into the ring-like shape. When placed in the mold, the resin material flows through the gap 5h to connect the resin material located on the outer and inner peripheral surfaces of the slip ring. However, since the gap 5h is asymmetrical, the gap 5h should be as narrow as possible so that it does not affect the balanced center of gravity of the slip ring.

Figure 2A:
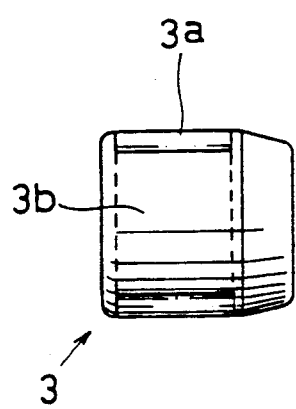
FIGS. 2A and 2B are respectively front and cross-sectional views of a first embodiment of a slip ring according to the present invention.
Figure 2B:
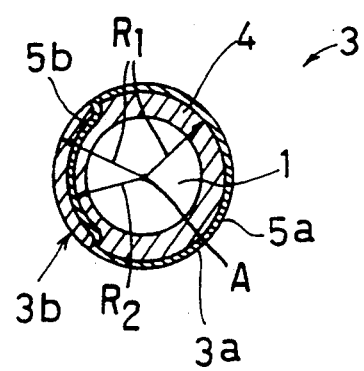
Figure 3:
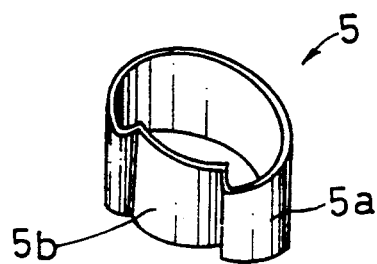
FIG. 3 is a perspective view of the conductor in FIGS. 2A and 2B.
Figure 13:
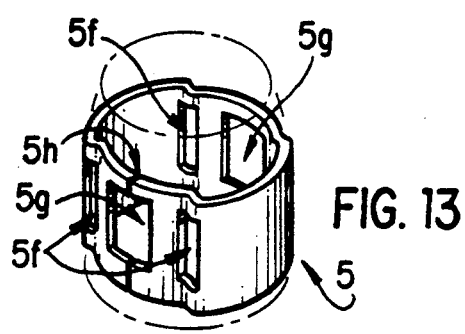
FIG. 13 is a perspective view cf the conductor of FIGS. 12A and 12B.
Figure 12A:
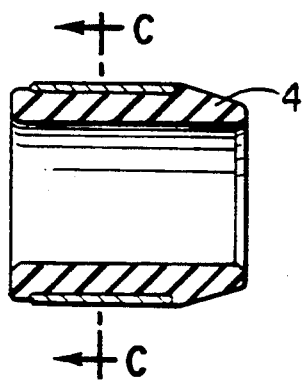
FIGS. 12A and 12B are cross-sectional front and side views, respectively- of a conductor similar in construction to the conductor of FIGS. 2A and 2B but with two non-conducting portions, the FIG. 12B view taken along line C in FIG. 12A.
Figure 12B:
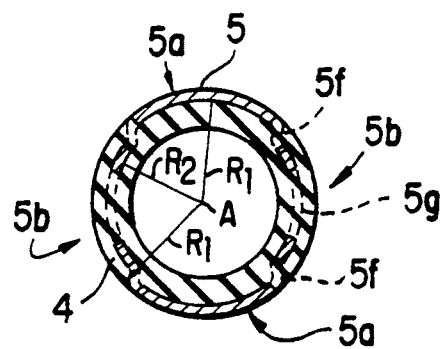

As another alternative to claws 5e, the conductor of FIGS. 2A and 2B may be provided with windows through the non-conducting portion 5b of the conductor. For example, in FIGS. 12A, 12B and 13 (FIGS. 12A, 12B and 13 illustrate a conductor similar in shape to the conductor of FIGS. 2A and 2B but with two diametrically opposite non-conducting portions), a central window 5g may be located in the non-conducting portion 5b, and two side windows 5f may be located in the stepped portions, one side window 5f being located on each side of the central window 5g. When the conductor 5 is placed in the mold and the resin material fills the mold, the resin will flow through the windows 5f, 5g and the gap 5h, to connect the resin material 4 located on the inner and outer peripheral surfaces of the non-conducting portions of the slip ring. In FIGS. 12A, 12B and 13, a balanced center of gravity is maintained since the windows 5f, 5g are located symmetrically around the conductor.

Figure 14:
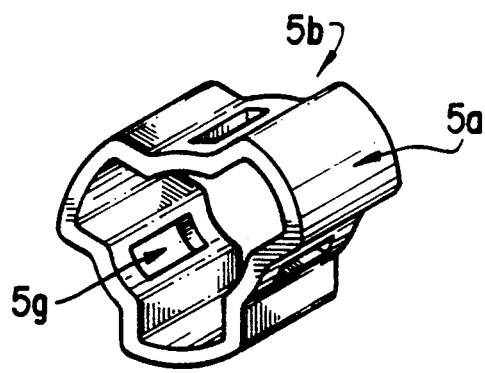
FIG. 14 is a perspective view of a conductor having three symmetrically arranged pairs of conducting and non-conducting portions.

In the embodiment of FIGS. 12A, 12B and 13, the conductor 5 is provided with two opposing conductor portions 5a and two opposing non-conductor portions 5b, which are symmetrically arranged on the conductor 5 to maintain the balanced center of gravity. As illustrated in FIG. 12B, the non-conducting portion 5b defines an arc having the second radius $R_2$ while the insulating material on the non-conducting portion defines an arc having the first radius $R_1$ equal to the radius $R_1$ of the arc defining the conducting portion 5a. Each conducting portion 5a extends over a first angle and each non-conducting portion extends over a second angle, and preferably the first and second angles are equal for a symmetrical arrangement. FIG. 14 illustrates an embodiment having three conducting portions 5a and three non-conducting portions 5b, all of which are symmetrically arranged on the conductor 5.

When one conducting portion opposes one non-conducting portion, a single pulse signal is generated for each rotation of the slip ring. Two, three or more signals can be generated by respectively forming the conductor with two, three or more pairs of conducting and non-conducting portions thus providing even more pulse signal data for monitoring rotation of the motor armature.

The invention has been described in detail with reference to the preferred embodiments which are intended to be illustrative and non-limiting. Various changes may be made without departing from the spirit and scope of the invention as defined in the appended claims.

What is claimed is:

1. A rotation-detecting slip ring with which a pair of brushes make contact with an outer periphery of the slip ring upon rotation of the slip ring about a rotational axis, comprising:

at least one conducting portion which extends along an outer periphery of said slip ring over a first angle; and at least one non-conducting portion which extends over a second angle;

wherein a conductor which forms said conducting portion has a ring-like shape and also forms said non-conducting portion, a portion of said conductor which corresponds to said non-conducting portion having a window through which an insulating resin material is exposed to an outer periphery of the slip ring.

2. The slip ring of claim 1, wherein the sum of the first and second angles equals 360 degrees.

3. The slip ring of claim 1, wherein the first angle is about 210 degrees and the second angle is about 150 degrees.

4. The slip ring of claim 1, wherein the conductor includes a plurality of conducting portions and a corresponding plurality of non-conducting portions, each non-conducting portion alternating with each conducting portion, each conducting portion extending over the first angle and each non-conducting portion extending over the second angle.

5. The rotation-detecting slip ring according to claim 1, wherein said portion of said conductor which corresponds to said non-conducting portion is made wider in an axial direction of said slip ring than to said conducting portion.

6. The rotation-detecting slip ring according to claim 1, wherein said portion of said conductor which corresponds to said non-conducting portion is made thicker in a radial direction than said conducting portion.

7. The slip ring of claim 1, further comprising anchor means in the conductor for anchoring the conductor to the insulating resin material.

8. The slip ring of claim 7, wherein the anchor means is located in the conducting portion of the conductor.

9. The slip ring of claim 8, wherein the anchor means is at least one claw extending radially inwardly from an inner periphery of the conductor and embedded in the insulating resin material.

10. The slip ring of claim 7, wherein the anchor means is located in the non-conducting portion of the conductor.

11. The slip ring of claim 10, wherein the anchor means is a window extending through the non-conducting portion of the conductor.

12. A rotation-detecting slip ring with which a pair of brushes make contact with an outer periphery of the slip ring upon rotation of the slip ring about a rotational axis, comprising:

at least one conducting portion which extends along an outer periphery of said slip ring over a first angle; and at least one non-conducting portion which extends over a second angle;

wherein a conductor which forms said conducting portion has a ring-like shape and also forms said non-conducting portion, a portion of said conductor which corresponds to said non-conducting portion having a recess through which an insulating resin material is exposed to the outer periphery of the slip ring.

13. The slip ring of claim 12, wherein the sum of the first and second angles equals 360 degrees.

14. The slip ring of claim 12, wherein the first angle is about 210 degrees and the second angle is about 150 degrees.

15. The slip ring of claim 12, wherein the conductor includes a plurality of conducting portions and a corresponding plurality of non-conducting portions, each non-conducting portion alternating with each conducting portion, each conducting portion extending over the first angle and each non-conducting portion extending over the second angle.

16. The rotation-detecting slip ring according to claim 12, wherein said portion of said conductor which corresponds to said non-conducting portion is made wider in an axial direction of said slip ring than said conductor corresponding to said conducting portion.

17. The rotation-directing slip ring according to claim 12, wherein said portion of said conductor which corresponds to said non-conducting portion is made thicker in a radial direction than said conductor corresponding to said conducting portion.

18. The slip ring of claim 12, further comprising anchor means in the conductor for anchoring the conductor to the insulating resin material.

19. The slip ring of claim 18, wherein the anchor means is located in the conducting portion of the conductor.

20. The slip ring of claim 19, wherein the anchor means is at least one claw extending radially inwardly from an inner periphery of the conductor and embedded in the insulating resin material.

21. The slip ring of claim 18, wherein the anchor means is located in the non-conducting portion of the conductor.

22. The slip ring of claim 21, wherein the anchor means is a window extending through the non-conducting portion of the conductor.

* * * * *